(12) United States Patent
Park et al.

(10) Patent No.: US 9,069,402 B2
(45) Date of Patent: Jun. 30, 2015

(54) DISPLAY APPARATUS

(75) Inventors: Kyung-ho Park, Asan-si (KR);
Woongkwon Kim, Cheonan-si (KR);
Dong-Won Park, Hwaseong-si (KR);
JaeSung Bae, Suwon-si (KR);
Bonghyun You, Yongin-si (KR); Jaewon Kim, Asan-si (KR); HyungJun Park, Seongnam-si (KR); Dong Hee Shin, Seoul (KR); Si Hyun Ahn, Cheonan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 631 days.

(21) Appl. No.: 13/314,719

(22) Filed: Dec. 8, 2011

(65) Prior Publication Data

US 2013/0033471 A1 Feb. 7, 2013

(30) Foreign Application Priority Data

Aug. 1, 2011 (KR) .................... 10-2011-0076736

(51) Int. Cl.
*G09G 3/20* (2006.01)
*G02F 1/1333* (2006.01)
(Continued)

(52) U.S. Cl.
CPC ...... *G06F 3/0412* (2013.01); *G09G 2310/0286* (2013.01); *G09G 3/20* (2013.01);
(Continued)

(58) Field of Classification Search
CPC .............. G09G 2310/0286; G09G 2310/0223;
G09G 2310/0233; G09G 2310/0266; G09G 2320/0204; G02F 1/1343; G02F 1/1333;
G02F 1/1335; G02F 1/1345; G02F 1/13452
USPC .......... 377/64–81; 345/100, 204–214, 87, 40;
361/761, 783
See application file for complete search history.

(56) References Cited

U.S. PATENT DOCUMENTS 7,532,266 B2 * 5/2009 Sun et al. .................... 349/40
7,750,888 B2 * 7/2010 Song et al. .................. 345/103

(Continued)

FOREIGN PATENT DOCUMENTS

KR 10-2006-0077726 7/2006
KR 10-2007-0013578 1/2007
KR 10-2008-0052952 6/2008

OTHER PUBLICATIONS

English Abstract for Publication No. 10-2006-0077726, Jul. 2006.
(Continued)

*Primary Examiner* — Kent Chang
*Assistant Examiner* — Herbert L Hagemeier
(74) *Attorney, Agent, or Firm* — F. Chau & Associates, LLC

(57) ABSTRACT

A display apparatus includes first, second, and third gate driving chips applying gate signals to gate lines. A gate driving voltage is applied to the first gate driving chip and a gate driving voltage of the same level is applied to the second and third gate driving chips. In addition, the display apparatus includes a plurality of photo-sensors and first, second, and third scan driving chips applying scan signals to scan lines connected to the photo-sensors. A scan driving voltage is applied to the first scan driving chip and a scan driving voltage of the same level is applied to the second and third scan driving chips.

25 Claims, 10 Drawing Sheets

(51) Int. Cl.
*G02F 1/1345* (2006.01)
*G06F 3/041* (2006.01)
*G06F 3/042* (2006.01)

(52) U.S. Cl.
CPC ........ *G09G 3/2003* (2013.01); *G09G 2300/023* (2013.01); *G09G 2300/0426* (2013.01); *G09G 2300/0842* (2013.01); *G09G 2310/0218* (2013.01); *G09G2310/0267* (2013.01); *G09G 2360/148* (2013.01); *G06F 3/0421* (2013.01)

(56) References Cited

U.S. PATENT DOCUMENTS

2003/0117356 A1* 6/2003 Moon et al. ............... 345/87
2011/0069020 A1* 3/2011 Kim et al. ............... 345/173

OTHER PUBLICATIONS

English Abstract for Publication No. 10-2007-0013578, Jan. 2007.
English Abstract for Publication No. 10-2008-0052952, Jun. 2008.

* cited by examiner

DISPLAY APPARATUS

CROSS-REFERENCE TO RELATED APPLICATION

This application relies for priority upon Korean Patent Application No. 10-2011-0076736 filed on Aug. 1, 2011, the contents of which are herein incorporated by reference in its entirety.

BACKGROUND

1. Technical Field

The present invention relates to a display apparatus. More particularly, the present invention relates to a display apparatus including a plurality of gate drivers and a plurality of scan drivers.

2. Discussion of the Related Art

In general, a display apparatus includes a display panel to display an image. The display panel includes a first substrate, including a display area in which a plurality of pixels is arranged and a non-display area adjacent to the display area, and a second substrate facing the first substrate.

The first substrate includes a plurality of gate lines and a plurality of data lines insulated from the gate lines where crossing the gate lines. Each pixel of the first substrate includes a thin film transistor and a pixel electrode. The thin film transistor is connected to the pixel electrode, a corresponding gate line of the gate lines, and a corresponding data line of the data lines. The gate line and the data line may be used to switch on and off a pixel voltage applied to the pixel electrode.

The gate lines are divided into a plurality of groups and each group in which the gate lines are included is connected to different gate drivers. The scan lines are divided into a plurality of groups and each group in which the scan lines are included is connected to different scan drivers.

The gate drivers disposed on the first substrate receive gate driving voltages and apply the gate driving voltages to the gate lines, and the scan drivers disposed on the second substrate receive scan driving voltages and apply the scan driving voltages to the scan lines.

The gate driving voltages respectively applied to the gate drivers have different voltage levels from each other and the scan driving voltages respectively applied to the scan drivers have different voltage levels from each other. Accordingly, gate signals output from the gate drivers each have different levels and scan signals output from the scan drivers each have different levels.

SUMMARY

Exemplary embodiments of the present invention provide a display apparatus capable of applying voltages having the same voltage level to a plurality of gate drivers and a plurality of scan drivers.

According to the exemplary embodiments, a display apparatus includes a first substrate and a second substrate. The first substrate includes a first display area in which a plurality of pixels is arranged and a first non-display area disposed adjacent to the first display area. The second substrate includes a second display area, in which a plurality of photo-sensors is arranged, corresponding to the first display area and a second non-display area disposed adjacent to the first display area.

The display apparatus includes first, second, and third drivers arranged in at least one of the first non-display area or the second non-display area. The first non-display area and the second non-display area each include a driving chip.

In addition, the display apparatus includes a first connection line electrically connecting the first driver and the second driver. The first connection line transmits a driving voltage applied to the first driver to the second driver. The display apparatus additionally includes a second connection line electrically connected to the first connection line. The second connection line transmits the driving voltage applied to the first connection line to the driving chip included in the first driver.

Further, the display apparatus includes a third connection line connected to the second driver. The third connection line transmits the driving voltage to the driving chip included in the second driver and the driving chip included in the third driver. The driving voltage of the third connection line has the same level as the driving voltage of the first driving line.

The gate driver includes three gate drivers each applied with the gate driving voltage at the same level. In addition, the scan driver includes three scan drivers each receiving the scan driving voltage at the same level.

BRIEF DESCRIPTION OF THE DRAWINGS

The above and other aspects of exemplary embodiments of the present invention will become readily apparent by reference to the following detailed description when considered in conjunction with the accompanying drawings wherein.

DETAILED DESCRIPTION

Hereinafter, exemplary embodiments of the present invention will be explained in detail with reference to the accompanying drawings.

Figure 1:
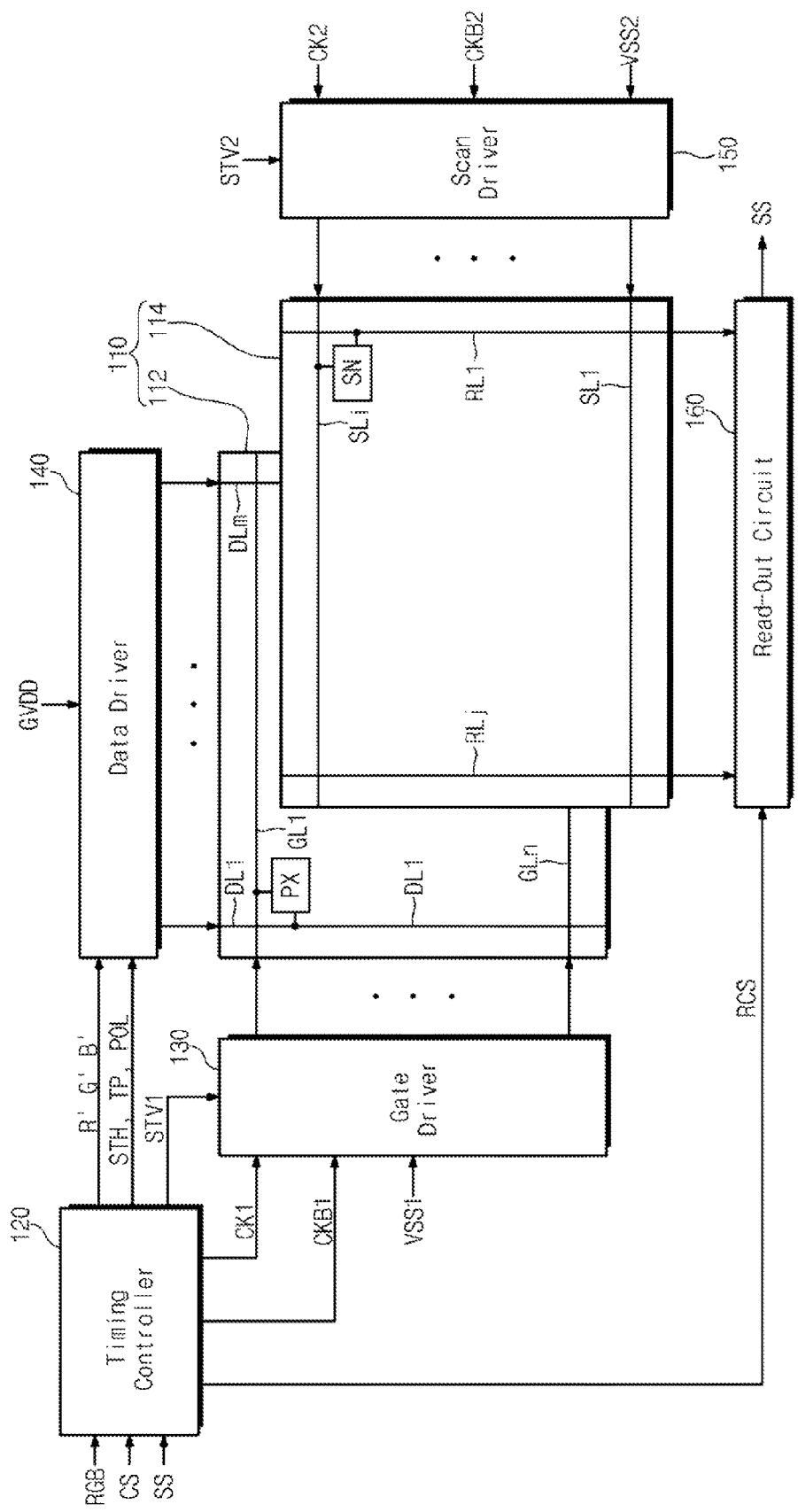
FIG. 1 is a block diagram showing a display apparatus according to an exemplary embodiment of the present invention.
Figure 2:
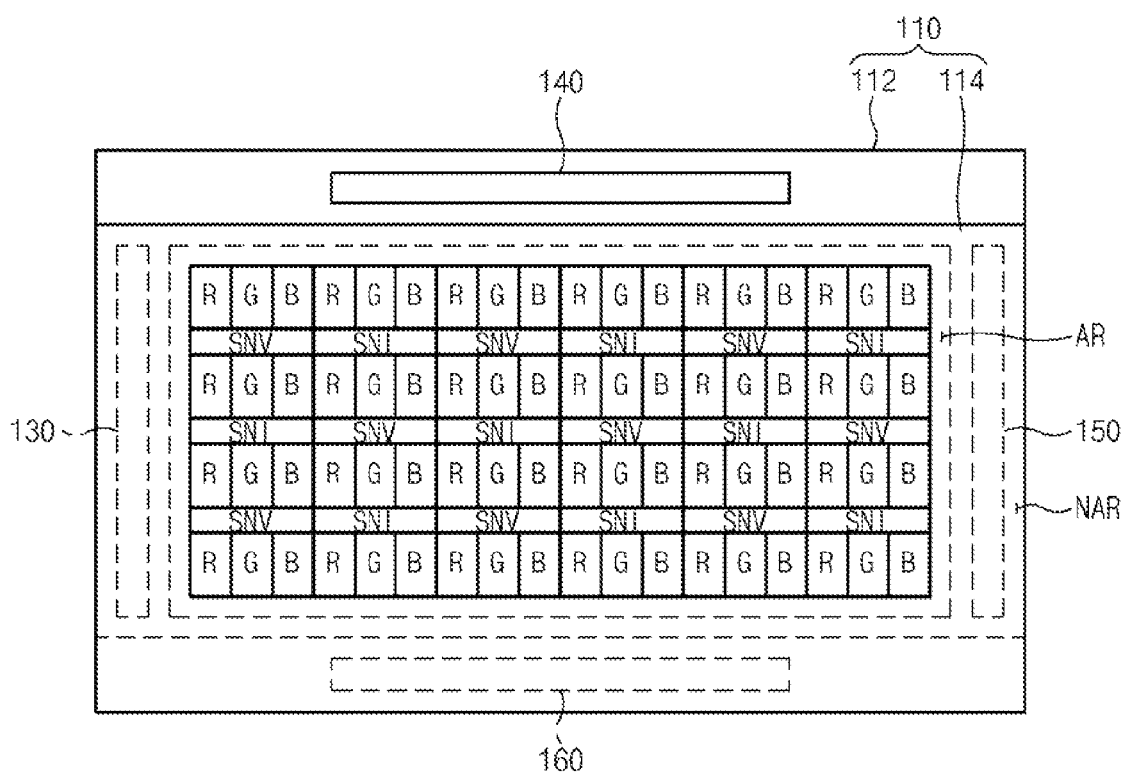
FIG. 2 is a plan view showing a display panel shown in FIG. 1.
Figure 3:
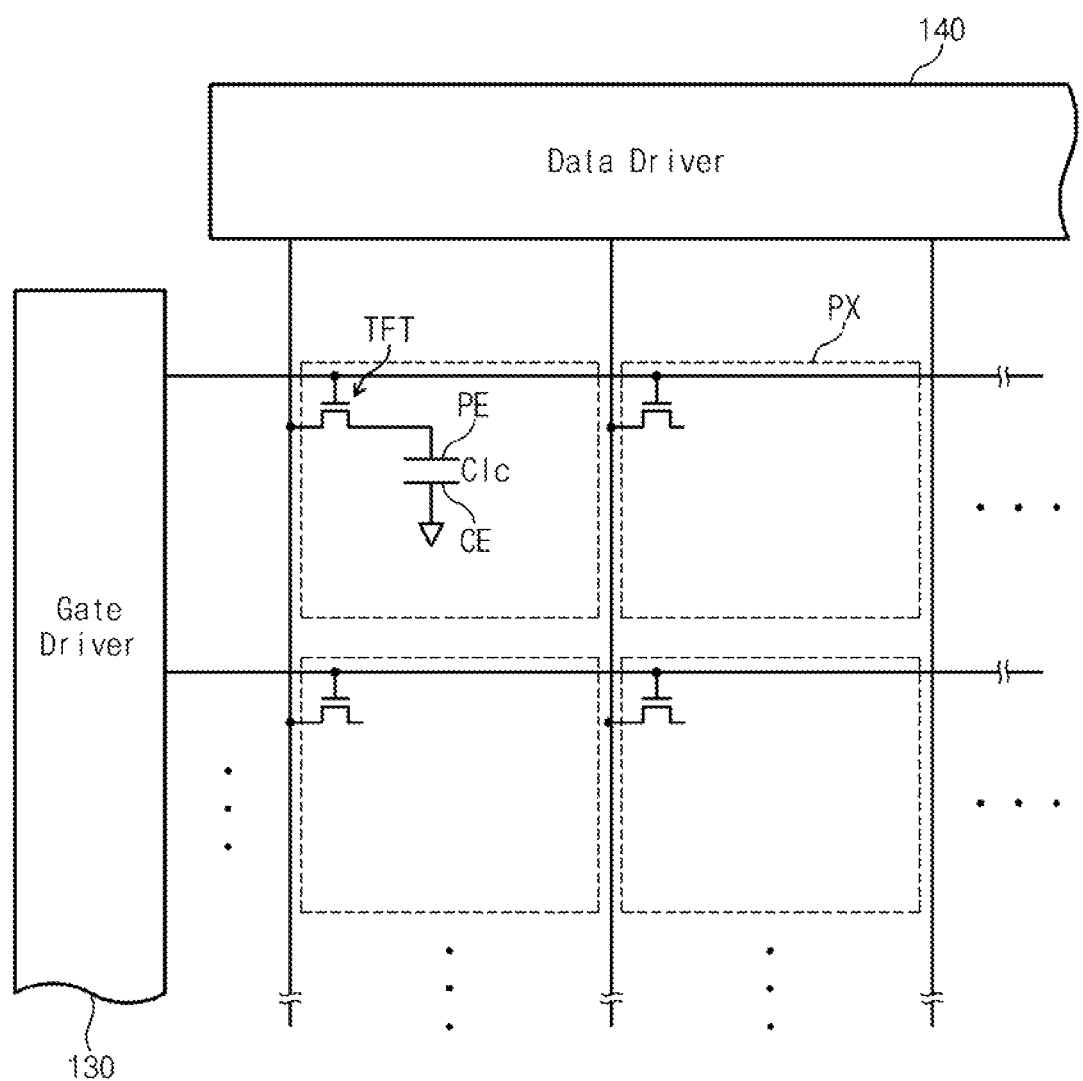
FIG. 3 is an equivalent circuit diagram showing a pixel shown in FIG. 1.
Figure 4:
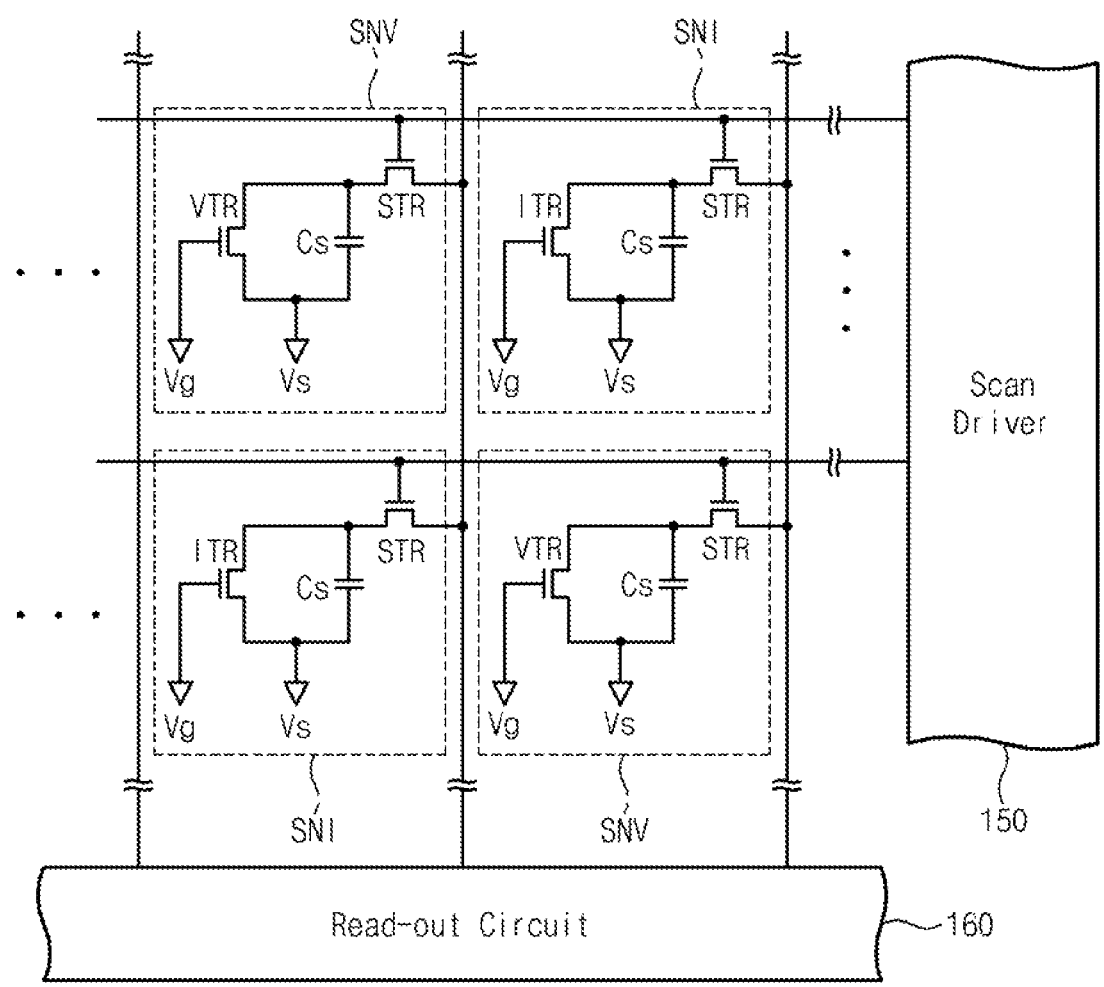
FIG. 4 is an equivalent circuit diagram showing a photo-sensor shown in FIG. 1.

FIG. 1 is a block diagram showing a display apparatus according to an exemplary embodiment of the present invention, FIG. 2 is a plan view showing a display panel shown in FIG. 1, FIG. 3 is an equivalent circuit diagram showing a pixel shown in FIG. 1, and FIG. 4 is an equivalent circuit diagram showing a photo-sensor shown in FIG. 1.

Referring to FIGS. 1 to 4, a display apparatus includes a display panel 110, a timing controller 120, a gate driver 130, a data driver 140, a scan driver 150, and a read-out circuit 160.

The display panel 110 displays an image. The display panel 110 may be, for example, a liquid crystal display (LCD) panel, an organic light emitting display (OLED) panel, an electrophoretic display panel, or an electrowetting display panel. For the purposes of providing a simple explanation, exemplary embodiments of the present invention will be described herein as having an LCD panel, although it should be understood that other display panels such as those listed above may alternatively be used.

Although not shown in FIGS. 1 and 2, the display apparatus may further include a backlight unit disposed adjacent to the display panel 110 to provide light to the display panel 110. The backlight unit may include a plurality of light sources emitting light in the visible range and a plurality of infrared light sources emitting light in the infrared range.

The timing controller 120 receives a plurality of image signals RGB and a plurality of control signals CS. The timing controller 120 applies gate control signals, such as a first start signal STV1, a first clock signal CK1, and/or a second clock signal CKB1, to the gate driver 130. In addition, the timing controller 120 converts a data format of the image signals RGB into a data format appropriate to an interface between the data driver 140 and the timing controller 120 and provides the converted image signals R'G'B'. The timing controller 120 applies data control signals such as an output start signal TP, a horizontal start signal STH, and a polarity inversion signal POL to the data driver 140. The timing controller 120 applies scan control signals such as a second start signal STV2, a third clock signal CK2, and a fourth clock signal CKB2 to the scan driver 150.

The gate driver 130 receives a gate driving voltage VSS1 from an external source. The gate driver 130 converts the gate driving voltage VSS1 into gate signals based on the gate control signals and sequentially applies the gate signals to gate lines GL1 to GLn.

The data driver 140 receives a reference voltage GVDD from an external source. The data driver 140 converts the image signals R'G'B' into data voltages based on the reference voltage GVDD in response to the data control signals TP, STH, and POL and applies the data voltages to data lines DL1 to DLm.

The scan driver 150 receives a scan driving voltage VSS2 from an external source. The scan driver 150 converts the scan driving voltage VSS2 into scan signals based on the scan control signals and sequentially applies the scan signals to scan lines SL1 to SLi. The scan control signals STV2, CK2, and CKB2 may be synchronized with the gate control signals STV1, CK1, and CKB1.

The read-out circuit 160 sequentially applies sensing signals SS provided through the read-out lines RL1 to RLj to the timing controller 120 in response to control signals RCS from the timing controller 120. The timing controller 120 generates a two-dimensional coordinate value of information with respect to a touch position on a screen or an object to be scanned based on a generation timing of the scan signal and the sensing signals SS from the read-out circuit 160.

The display panel 110 includes a first substrate 112 including a display area AR in which a plurality of pixels PX is arranged and a non-display area NAR adjacent to the display area AR. The image is displayed on the display area AR and is not displayed on the non-display area NAR. The first substrate 112 may be a glass substrate, a silicon substrate, or a film substrate.

The display panel 110 includes a second substrate 114 facing the first substrate 112. As shown in FIG. 2, the second substrate 114 may be coupled with the first substrate 112 and may be partially overlapped with the first substrate 112. The second substrate 114 includes a display area AR and a non-display area NAR respectively corresponding to the display area AR and the non-display area NAR of the first substrate 112.

The second substrate 114 includes a plurality of photo-sensors SN arranged in the display area AR thereof. There may be two types of photo-sensors SN. For example, the photo-sensors SN may include a plurality of visible light sensors SNV sensing light in the visible range and a plurality of infrared light sensors SNI sensing light in the infrared range.

The second substrate 114 may include at least one of a common electrode or a color filter. The color filter includes a red pixel "R" displaying a red color image, a green pixel "G" displaying a green color image, and a blue pixel "B" displaying a blue color image. According to FIG. 2, one visible light sensor SNV or one infrared light sensor SNI is disposed corresponding to three color pixels: a red pixel "R", a green pixel "G", and a blue pixel "B."

The three color pixels may be together referred to as one color pixel group. The visible light sensor SNV or the infrared light sensor SNI may be disposed in an area in which a black matrix is formed to separate adjacent color pixel groups from one another. However, the arrangements of the pixels and sensors may be varied according to embodiments.

As shown in FIG. 1, the gate lines GL1 to GLn and the data lines DL1 to DLm are disposed on the first substrate 112. The gate lines GL1 to GLn are extended in a first direction D1, and the data lines DL1 to DLm are extended in a second direction D2. The first direction D1 is perpendicular to the second direction D2. The gate lines GL1 to GLn thereby cross the data lines DL1 to DLm. However, the gate lines GL1 to GLn and the data lines DL1 to DLm are insulated from each other at least where they cross. The gate lines GL1 to GLn are connected to the gate driver 130 and the data lines DL1 to DLm are connected to the data driver 140.

Referring to FIG. 3, each pixel PX includes a pixel electrode PE and a thin film transistor TFT. Although not shown in FIG. 3, each pixel PX may further include a storage capacitor. According to an exemplary embodiment of the present invention, the pixels PX have the same structure and function, and thus one pixel PX will be described in detail as a representative example.

The thin film transistor TFT switches the pixel voltage corresponding to the image displayed in the pixel PX. The thin film transistor TFT includes a gate electrode, an active layer, a source electrode, and a drain electrode. The gate electrode is branched from a corresponding gate line of the gate lines GL1 to GLn disposed on the first substrate 112.

A first insulating layer (not shown) is disposed on the first substrate 112 to cover the gate lines GL1 to GLn and the gate electrode. An active layer formed of hydrogenated amorphous silicon or polycrystalline silicon is disposed on the first insulating layer. The source electrode and the drain electrode are disposed on the active layer and are spaced apart from each other to expose a portion of the active layer. The data lines DL1 to DLm are disposed on the first insulating layer. The source electrode is branched from a corresponding data line of the data lines DL1 to DLm.

According to an exemplary embodiment, an ohmic contact layer may be disposed between the active layer and the source electrode and between the active layer and the drain electrode in an island shape or a line shape. The ohmic contact layer is formed of silicide or n+ hydrogenated amorphous silicon highly doped with an n-type dopant.

A second insulating layer (not shown) is disposed on the first insulating layer and covers the source electrode, the drain electrode, and the exposed active layer.

The pixel electrode PE is disposed on the second insulating layer and is electrically connected to the drain electrode through a contact hole formed through the second insulating layer. The pixel electrode PE includes a transparent conductive material, such as indium tin oxide, indium zinc oxide, etc., or a reflective material such as aluminum. The pixel electrode PE forms a liquid crystal capacitor together with the common electrode CE.

The scan lines SL1 to SLi and the read-out lines RL1 to RLj crossing the scan lines SL1 to SLi are disposed on the second substrate 114, and at least one of the visible light sensor SNV or the infrared light sensor SNI is disposed on the second substrate 114.

The scan lines SL1 to SLi are connected to the scan driver 150 to sequentially receive the scan signals. The read-out lines RL1 to RLj are connected to the read-out circuit 160 and apply the voltage charged in a corresponding sensor SN to the read-out circuit 160.

Referring to FIG. 4, each of the visible light sensors SNV and the infrared light sensors SNI includes a switching transistor STR and a sensing capacitor Cs. For the convenience of explanation, four sensors have been shown in FIG. 4. The switching transistor STR includes a first electrode connected to one of the scan lines SL1 to SLi, a second electrode connected to one of the read-out lines RL1 to RLj, and a third electrode connected to the sensing capacitor Cs and the sensing transistors VTR and ITR included in the visible light sensor SNV and the infrared light sensor SNI.

For example, the visible light sensor SNV includes a visible light sensing transistor VTR to sense light in the visible range and the infrared light sensor SNI includes an infrared sensing transistor ITR to sense light in the infrared range. Although not shown in FIG. 4, the infrared light sensing transistor ITR may include a semiconductor layer of silicon germanium (SiGe) and the visible light sensing transistor VTR may include a semiconductor layer of amorphous silicon (a-Si).

The sensing capacitor Cs includes a first electrode connected to the third electrode of the switching transistor STR and a second electrode applied with a source bias voltage Vs. Each of the sensing transistors VTR and ITR includes a first electrode applied with a gate bias voltage Vg, a second electrode applied with the source bias voltage Vs, and a third electrode connected to the first electrode of the sensing capacitor Cs.

Hereinafter, a method of sensing light incident to the sensors SN after being reflected by an external object and a method of measuring a signal corresponding to an intensity of the sensed light using the read-out circuit 160 will be described.

The read-out circuit 160 applies a predetermined voltage, e.g., 1 volt, to the read-out lines RL1 to RLi. When a gate-on signal is applied to the scan lines SL1 to SLi to turn on the switching transistor STR, the switching transistor STR provides the 1-volt voltage to the sensing capacitor Cs from the read-out circuit 160. Accordingly, the first electrode of the sensing capacitor Cs connected to the switching transistor STR is applied with the 1-volt voltage and the second electrode of the sensing capacitor Cs is applied with the source bias voltage Vs, e.g., −4 volt, so that 5-volt voltage is applied to the sensing capacitor Cs.

When light from the exterior is not incident to the sensing transistors VTR and ITR, the sensing transistors VTR and ITR are turned off so as to maintain the first electrode of the sensing capacitor Cs at the 1-volt voltage. Although the switching transistor STR is turned on by applying a next gate-on signal to the scan lines SL1 to SLi, a voltage difference does not occur between the first electrode of the sensing capacitor Cs and the read-out circuit 160, and thus a current does not flow to the read-out circuit 160 through the read-out lines RL1 to RLi.

On the contrary, when light from the exterior is incident to the sensing transistors VTR and ITR, the sensing transistors VTR and ITR are turned on and electric charges move through the turned-on sensing transistors VTR and ITR from the first electrode of the sensing capacitor Cs. Thus, the voltage of the first electrode of the sensing capacitor Cs may be varied.

Where that the switching transistor STR is turned on by applying a next gate-on signal to the scan lines SL1 to SLi when the voltage of the first electrode of the sensing capacitor CS is changed to 0.5 volts, a voltage difference of about 0.5 volts occurs between the first electrode of the sensing capacitor Cs and the read-out circuit 160, and thus electric charge flows through the read-out lines RL1 to RLj. The read-out circuit 160 may include an integrator (not shown) charging electric charge therein and measuring the intensity of light incident to the sensors SN based on the amount of electric charge charged in the integrator.

As the intensity of light incident to the sensing transistors VTR and ITR becomes large, the voltage of the first electrode of the sensing capacitor Cs is relatively changed and the voltage difference between the first electrode of the sensing capacitor Cs and the read-out circuit 160 becomes large. As a result, the current flowing through the read-out lines RL1 to RLi becomes large. Consequently, the read-out circuit 160 may measure the voltage having the level depending on the intensity of light incident to the sensing transistors VTR and ITR.

Responsive to the read-out control signal RCS from the timing controller 130, the read-out circuit 160 charges electric charge in the integrator using the sensed current provided through the read-out lines RL1 to RLi. Then, the read-out circuit 160 sequentially provides the sensing signals SS, e.g., the voltages corresponding to the amount of electric charge charged in the integrator, to the timing controller 120.

According to an exemplary embodiment, the gate driver 130 and the scan driver 150 may be disposed in the non-display area NAR of the first substrate 112 and the non-display area NAR of the second substrate 114, respectively. In addition, the gate driver 130 and the scan driver 150 may be mounted on the first substrate 112 by a chip-on-glass method. Further, the gate driver 130 and/or the data driver 140 may be coupled to the first substrate 112 through a flexible printed circuit board using a tape-carrier-package scheme. Moreover, the gate driver 130 and the scan driver 150 may be directly integrated on the non-display area NAR using an amorphous silicon gate (ASG) method.

Figure 5:
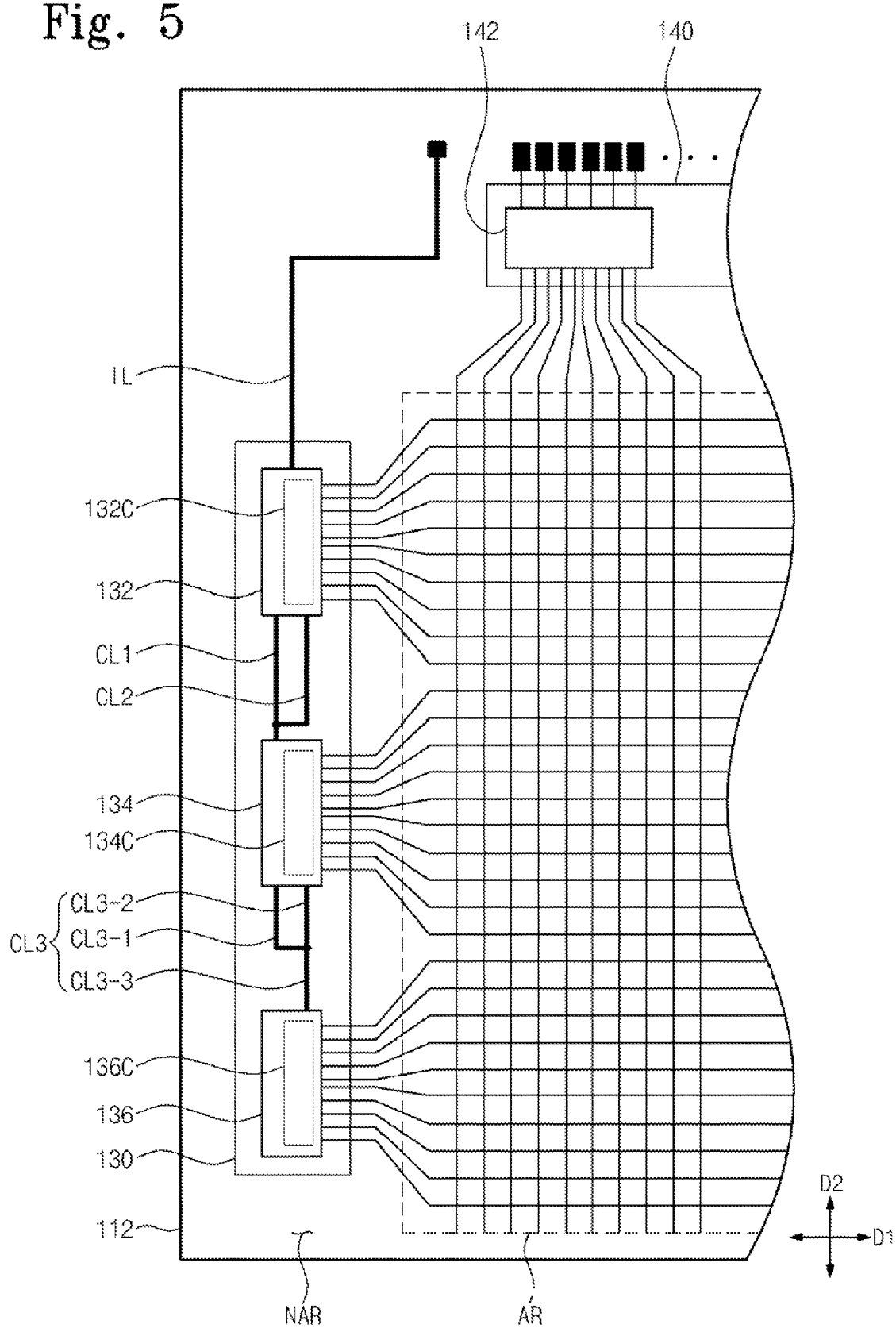
FIG. 5 is a partially enlarged plan view showing a portion of a first substrate shown in FIG. 1.
Figure 6:
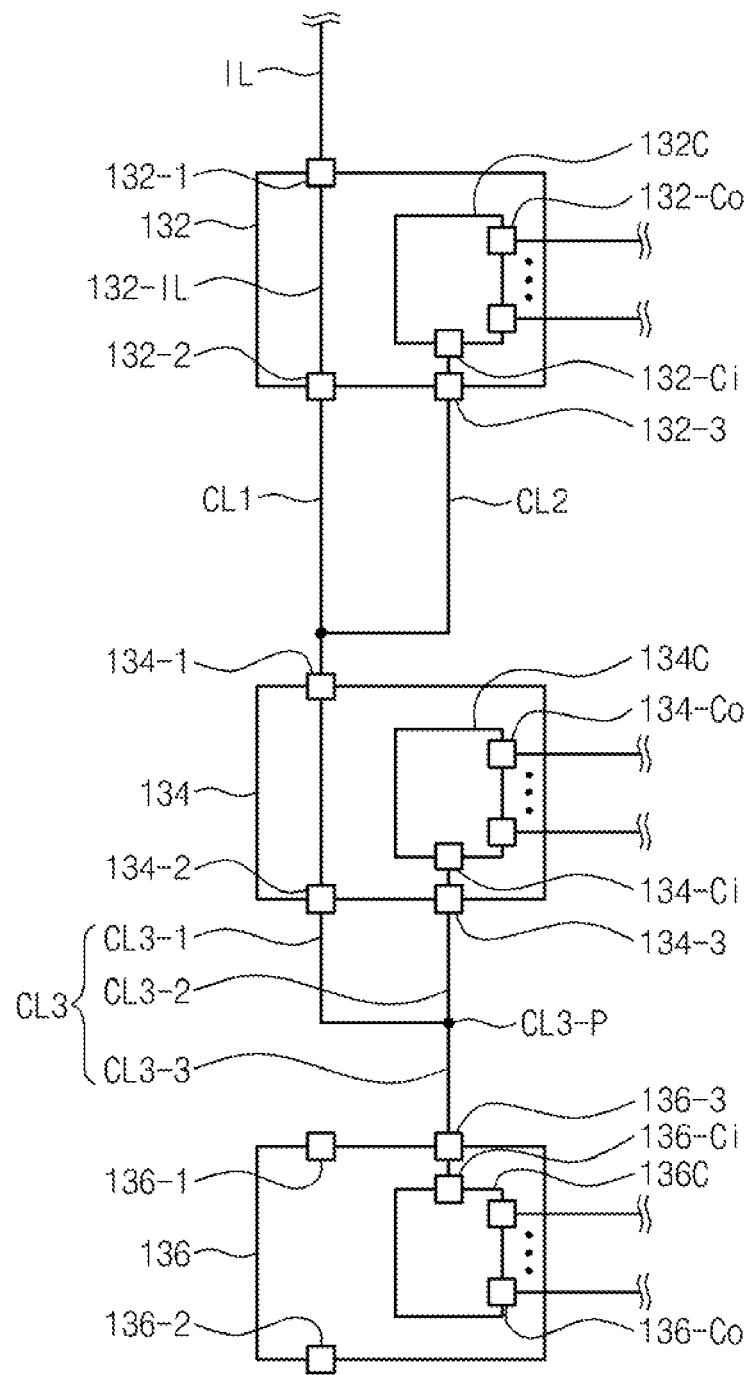
FIG. 6 is an enlarged view showing a gate driver shown in FIG. 5.
Figure 7:
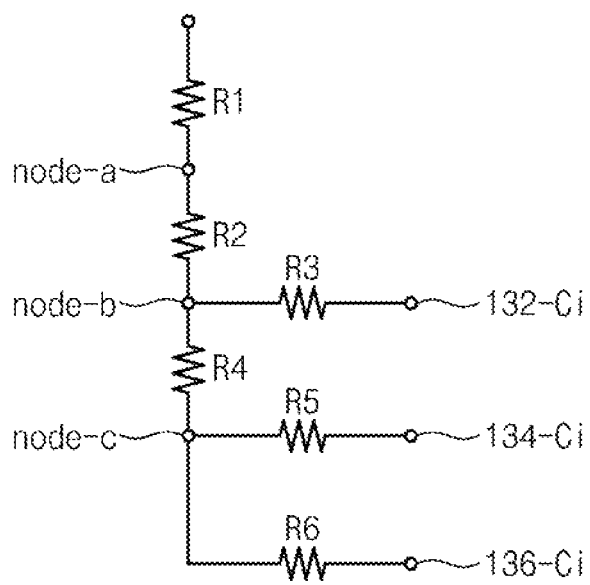
FIG. 7 is an equivalent circuit diagram of gate drivers shown in FIG. 6.

FIG. 5 is a partially enlarged plan view showing a portion of a first substrate shown in FIG. 1, FIG. 6 is an enlarged view showing a gate driver shown in FIG. 5, and FIG. 7 is an equivalent circuit diagram of gate drivers shown in FIG. 6.

Referring to FIG. 5, the gate driver 130 includes a first gate driver 132, a second gate driver 134, and a third gate driver 136 as shown in FIG. 6. In particular, FIG. 5 shows the first, second, and third gate drivers 132, 134, and 136 mounted on the first substrate 112 by the chip-on-glass method.

One data driver 142 is shown in FIG. 5, however, the data driver 140 may include a plurality of data drivers 142.

The first, second, and third gate drivers 132, 134, and 136 are disposed in the non-display area NAR and are sequentially and successively arranged in the second direction D2.

The first, second, and third gate drivers 132, 134, and 136 include first, second, and third gate driving chips 132C, 134C, and 136C. Each of the first, second, and third gate driving chips 132C, 134C, and 136C converts the gate driving voltage applied thereto into the gate signal.

The first, second, and third gate driving chips 132C, 134C, and 136C respectively include input terminals 132-Ci, 134-Ci, and 136-Ci, which are applied with the gate driving voltages. In addition, the first, second, and third gate driving chips 132C, 134C, and 136C respectively include output terminals 132-Co, 134-Co, and 136-Co to output the gate signals. Each of the gate lines GL1 to GLn is connected to different one of the output terminals 132-Co, 134-Co, and 136-Co.

The first gate driver 132 includes a first terminal 132-1 to which the gate driving voltage is applied. The gate driving voltage is output from a second terminal 132-2. An inner line 132-IL connects the first tell signal 132-1 and the second terminal 132-2. A third terminal 132-3 is electrically connected to the input terminal 132-Ci of the first gate driver 132.

The second gate driver 134 includes a first terminal 134-1 to which the gate driving voltage is applied. The gate driving voltage is output from a second terminal 134-2. An inner line 134-IL connects the first terminal 134-1 and the second terminal 134-2. A third terminal 134-3 is electrically connected to the input terminal 134-Ci of the second gate driver 134.

The third gate driver 136 includes a first terminal 136-1 to which the gate driving voltage is applied. The gate driving voltage is output from a second terminal 136-2. An inner line 136-IL connects the first terminal 136-1 and the second terminal 136-2. A third terminal 136-3 is electrically connected to the input terminal 136-Ci of the third gate driver 136.

According to an exemplary embodiment, the gate driving voltage is applied to the first, second, and third gate driving chips 132C, 134C, and 136C at the same level. For example, the gate driving voltage applied to the first gate driving chip 132C is equal in voltage level to the gate driving voltage applied to the second gate driving chip 134C and this, in turn, is equal in voltage level to the gate driving voltage applied to the third gate driving chip 136C.

Hereinafter, a connection relation between the first, second, and third gate drivers 131, 134, and 136 will be described in detail. For the convenience of explanation, lines through which the gate control signals are transmitted have been omitted. In addition, a driving voltage lead-in line IL and first, second, and third connection lines CL1, CL2, and CL3 may be disposed on the same layer as the gate lines GL1 to GLn, the data lines DL1 to DLm, or the pixel electrode PE. In this case, the driving voltage lead-in line IL, the first connection line CL1, the second connection line CL2, and the connection line CL3 may be disposed on different layers from each other and may be connected to each other through contact holes formed through the first insulating layer or the second insulating layer.

The gate driving voltage is applied to the first gate driver 132 through the driving voltage lead-in line IL. For example, an end of the driving voltage lead-in line IL is connected to the first terminal 132-1 of the first gate driver 132.

The gate driving voltage is transmitted to the second terminal 132-2 of the first gate driver 132 from the first terminal 132-1 of the first gate driver 132 through the inner line 132-IL. For example, the gate driving voltage applied to the first gate driver 132 is not directly applied to the first gate driving chip 132C.

The first connection line CL1 is disposed on the first substrate 112 and electrically connects the first gate driver 132 to the second gate driver 134. The first connection line CL1 is connected between the second terminal 132-2 of the first gate driver 132 and the first terminal 134-1 of the second gate driver 134. The first connection line CL1 transmits the gate driving voltage applied to the first gate driver 132 to the second gate driver 134.

The second connection line CL2 is disposed on the first substrate 112 and electrically connects the first connection line CL1 and the input terminal 132-Ci of the first gate driving chip 132C. The second connection line CL2 applies the gate driving voltage to the first gate driving chip 132C.

A first end of the second connection line CL2 is connected to the first connection line CL1 and a second end of the second connection line CL2 is connected to the input terminal 132-Ci of the first gate driving chip 132C.

As shown in FIG. 6, where the first gate driver 132 includes the third terminal 132-3 that is electrically connected to the input terminal 132-Ci of the first gate driving chip 132C, the second end of the second connection line CL2 is connected to the third terminal 132-3.

In addition, the second connection line CL2 may be electrically connected to the first connection line CL1 at the first terminal 134-1 of the second gate driver 134 so as to apply the gate driving voltage, which has the same level as the gate driving voltage applied to the second and third gate driving chips 134C and 136C, to the first gate driving chip 132C.

The third connection line CL3 is disposed on the first substrate 112 and applies the gate driving voltage, which has the same level as the gate driving voltage applied to the first gate driving chip 132C, to the second gate driving chip 134C and the third gate driving chip 136C.

The third connection line CL3 includes three ends. One of the three ends of the third connection line CL3 is electrically connected to the second terminal 134-2 of the second gate driver 134. Another end of the third connection line CL3 is electrically connected to the input terminal 134-Ci of the second gate driving chip 134C. Another end of the third connection line CL3 is electrically connected to the input terminal 136-Ci of the third gate driving chip 136C.

For example, one end of the third connection line CL3 is connected to the second terminal 134-2 of the second gate driver 134. The third connection line CL3 is divided into two portions at a branch point CL3-P. The remaining two ends are connected to the second gate driving chip 134C and the third gate driving chip 136C, respectively. Thus, the third connection line CL3 transmits the gate driving voltage applied to the second gate driver 134 to the second gate driving chip 134C and the third gate driving chip 136C.

The third connection line CL3 includes a first sub-line CL3-1 electrically connecting the second terminal 134-2 of the second gate driver 134 and the branch point CL3-P. A second sub-line CL3-2 electrically connects the branch point CL3-P and the input terminal 134-Ci of the second gate driving chip 134C. A third sub-line CL3-3 electrically connects the branch point CL3-P and the input terminal 136-Ci of the third gate driving chip 136C.

When the second gate driver 134 and the third gate driver 136 include the third terminals 134-3 and 136-3, respectively, the end of the second sub-line CL3-2 is connected to the third terminal 134-3 of the second gate driver 134 and the end of the third sub-line CL3-3 is connected to the third terminal 136-3 of the third gate driver 136.

FIG. 7 shows an equivalent circuit diagram of the driving voltage lead-in line IL and the first, second, and third connection lines CL1, CL2, and CL3 with respect to the first, second, and third gate driving chips 132C, 134C, and 136C.

Referring to FIG. 7, a first resistor R1 represents the driving voltage lead-in line IL, a second resistor R2 represents the first connection line CL1, and a third resistor R3 represents the second connection line CL2. In addition, a fourth resistor R4 represents the first sub-line CL3-1, a fifth resistor R5 represents the second sub-line CL3-2, and a sixth resistor R6 represents a third sub-line CL3-3.

Since a resistance value of the inner lines 132-IL and 134-IL disposed in the first and second gate drivers 132 and 134 is relatively small when compared with a resistance value of the first, second, and third connection lines CL1, CL2, and CL3, the inner lines 132-IL and 134-IL are not shown in FIG. 7 as separate resistors.

Accordingly, a first node node-a represents the first terminal 132-1 and the second terminal 132-2 of the first gate driver 132, and a second node node-b represents the first terminal 134-1 and a second terminal 134-2 of the second gate driver 134. In addition, a third node node-c represents the branch point CL3-P.

When the resistance values of the first, second, and third connection lines CL1, CL2, and CL3 are controlled, the first, second, and third gate driving chips 132C, 134C, and 136C may be applied with the gate driving voltage having the same level.

To provide the gate driving voltage to the first, second, and third gate driving chips 132C, 134C, and 136C at the same level, the resistance value of the third resistor R3 is substantially equal to a sum of the resistance value of the fourth resistor R4 and the resistance value of the fifth resistor R5. In addition, a sum of the resistance value of the fourth resistor R4 and the resistance value of the sixth resistor R6 is substantially equal to the resistance value of the third resistor R3. Consequently, the resistance value of the fifth resistor R5 is substantially equal to the resistance value of the sixth resistor R6.

The resistance value of the first, second, and third connection lines CL1, CL2, and CL3 may be varied depending on a width, a thickness, and a kind of conductive material of the connection lines CL1, CL2, and CL3. When a line resistance value of the second connection line CL2 is equal to a line resistance value of the third connection line CL3, the resistance value of the second and third connection lines CL2 and CL3 by adjusting a length of the second and third connection lines CL2 and CL3.

For example, when the line resistance value of the second connection line CL2 is equal to the line resistance value of the third connection line CL3, the length of the second connection line CL2 is equal to a sum of the length of the first sub-line CL3-1 and the length of the second sub-line CL3-2.

As described above, when the resistance value of a path through which the gate driving voltage is applied to the first, second, and third gate driving chips 132C, 134C, and 136C is controlled, the first, second, and third gate driving chips 132C, 134C, and 136C may receive the gate driving voltage having the same level.

Figure 8:
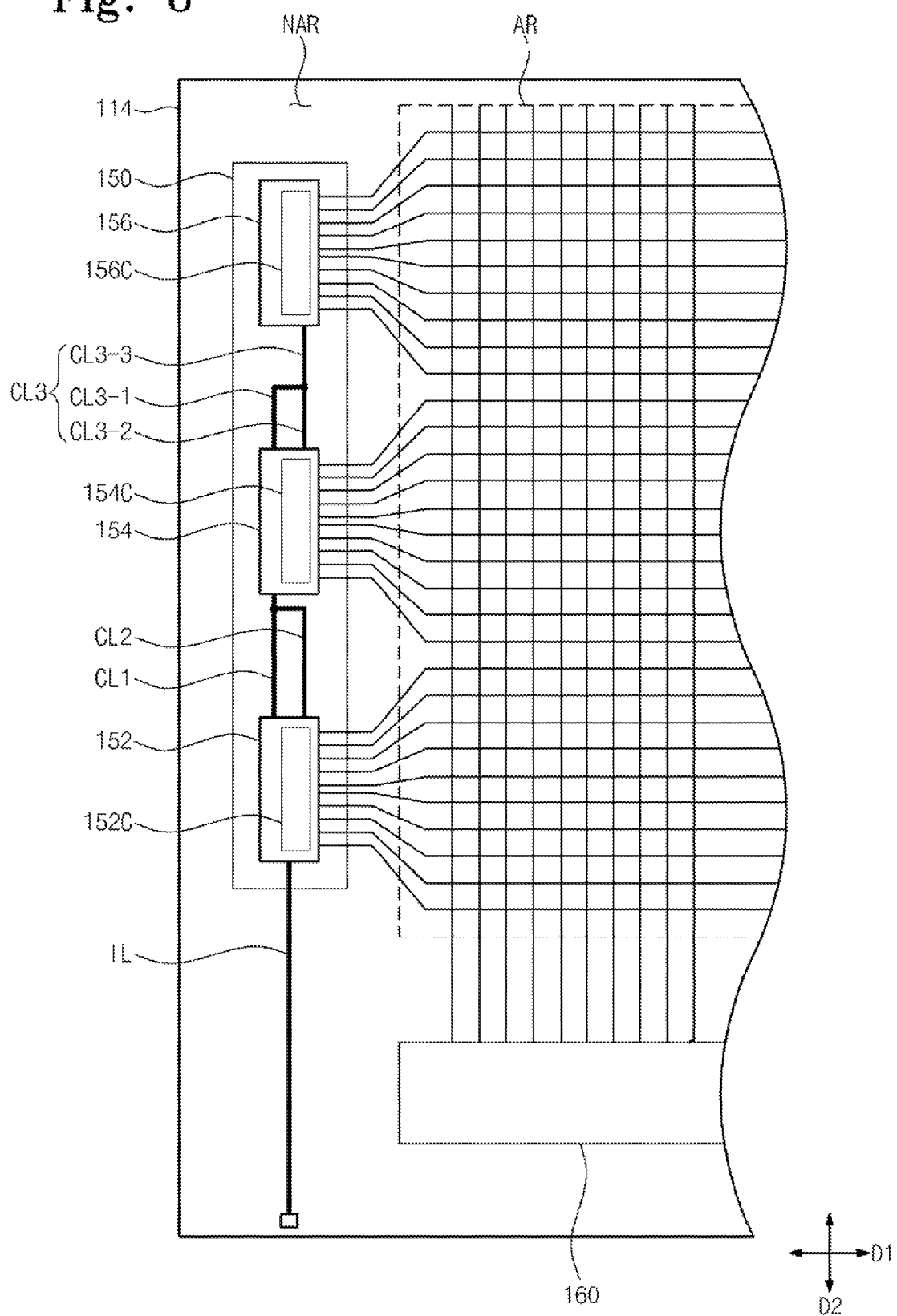
FIG. 8 is a partially enlarged plan view showing a portion of a second substrate shown in FIG. 1.
Figure 9:
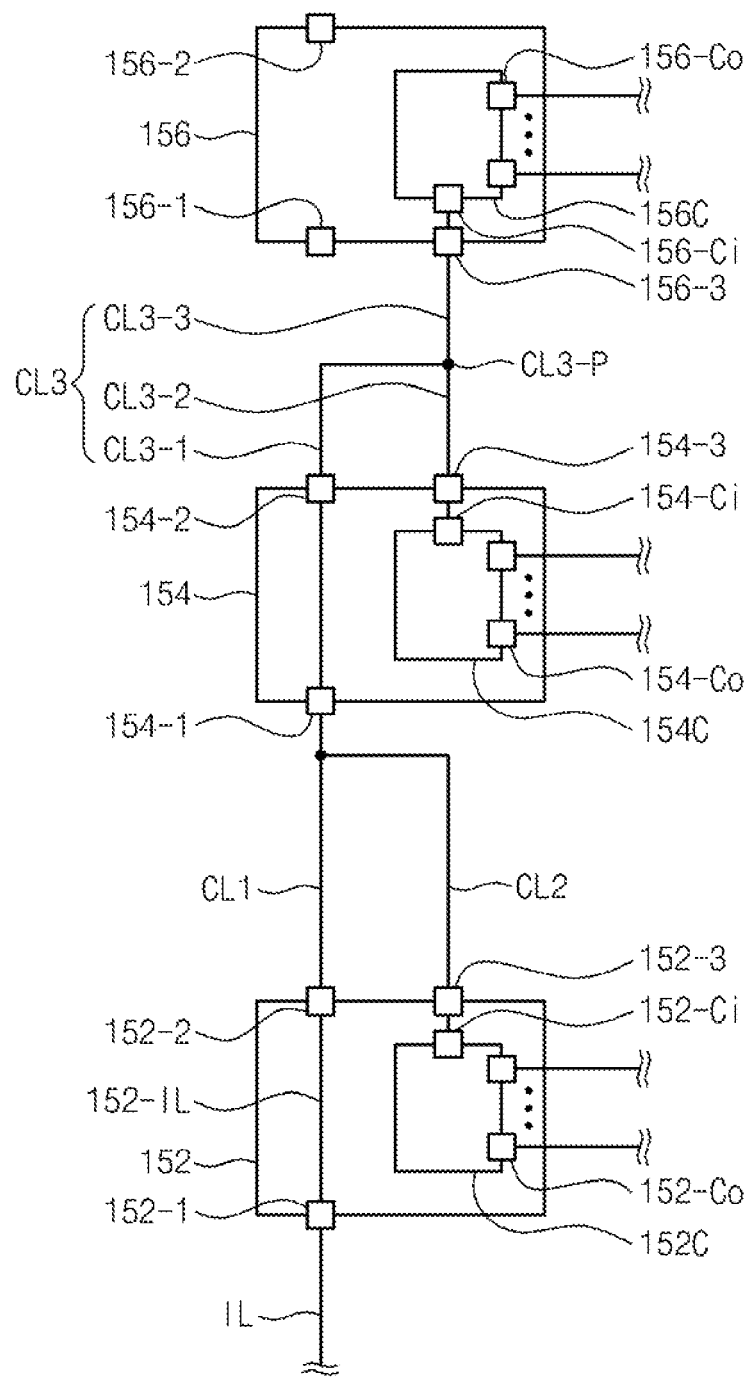
FIG. 9 is an enlarged view showing a scan driver shown in FIG. 8.
Figure 10:
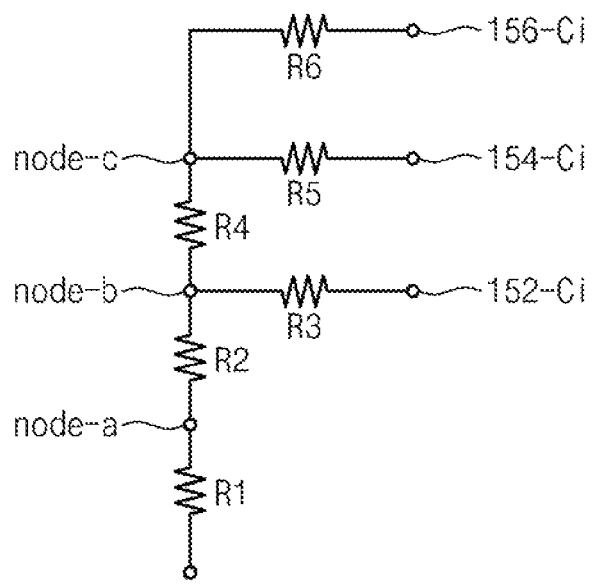
FIG. 10 is an equivalent circuit diagram of scan drivers shown in FIG. 9.

FIG. 8 is a partially enlarged plan view showing a portion of a second substrate shown in FIG. 1, FIG. 9 is an enlarged view showing a scan driver shown in FIG. 8, and FIG. 10 is an equivalent circuit diagram of scan drivers shown in FIG. 9.

The scan driver 150 includes first, second, and third scan drivers 152, 154, and 156 as shown in FIGS. 8 and 9. The first, second, and third scan drivers 152, 154, and 156 shown in FIG. 8 are mounted on the second substrate 114 by the chip-on-glass method.

The first, second, and third scan drivers 152, 154, and 156 are disposed in the non-display area NAR and sequentially successively arranged in the second direction D2. In addition, the first, second, and third scan drivers 152, 154, and 156 includes first, second, and third scan driving chips 152C, 154C, and 156C, respectively.

The first, second, and third scan driving chips 152C, 154C, and 156C receive the scan driving voltage at the same level. The first, second, and third gate driving chips 132C, 134C, and 136C receive the gate driving voltage at the same level. Each of the first, second, and third scan driving chips 152C, 154C, and 156C converts the scan driving voltage applied thereto into the scan signal.

Hereinafter, a connection relation between the first, second, and third scan drivers 152, 154, and 156 and the first, second, and third connection lines CL1, CL2, and CL3 will be described in detail with reference to FIGS. 8 to 10. In FIGS. 8 to 10, the lines through which the scan control signals are transmitted have been omitted to provide a simplified representation.

The first, second, and third connection lines CL1, CL2, and CL3 are disposed on the non-display area NAR of the second substrate 114. The first, second, and third connection lines CL1, CL2, and CL3 may be disposed on the same layer as the scan line SL1 to SLi or the read-out lines RL1 to RLj.

The first, second, and third scan driving chips 152C, 154C, and 156C respectively include input terminals 152-Ci, 154-Ci, and 156-Ci to which the scan driving voltage is applied. The first, second, and third scan driving chips 152C, 154C, and 156C respectively include output terminals 152-Co, 154-Co, and 156-Co from which the scan driving voltage is output. The scan lines SL1 to SLi are connected to the output terminals 152-Co, 154-Co, and 156-Co, respectively.

In addition, the first scan driver 152 includes a first terminal 152-1 to which the scan driving voltage is applied. The scan driving voltage is output from a second terminal 152-2. An inner terminal 152-IL connects the first terminal 152-1 and the second terminal 152-2. A third terminal 152-3 is electrically connected to the input terminal 152-Ci of the first scan driving chip 152C.

The second scan driver 154 includes a first terminal 154-1 to which the scan driving voltage is applied. The scan driving voltage is output from a second terminal 154-2. An inner terminal 154-IL connects the first terminal 154-1 and the second terminal 154-2. A third terminal 154-3 is electrically connected to the input terminal 154-Ci of the second scan driving chip 154C.

The third scan driver 156 includes a first terminal 156-1 to which the scan driving voltage is applied. The scan driving voltage is output from a second terminal 156-2. An inner terminal 156-IL connects the first terminal 156-1 and the second terminal 156-2. A third terminal 156-3 is electrically connected to the input terminal 156-Ci of the third scan driving chip 156C.

The scan driving voltage is applied to the first scan driver 152 through the driving voltage lead-in line IL. For example, an end of the driving voltage lead-in line IL is connected to the first terminal 152-1 of the first scan driver 152.

The scan driving voltage is transmitted to the second terminal 152-2 of the first scan driver 152 from the first terminal 152-1 of the first scan driver 152 through the inner line 152-IL. The scan driving voltage applied to the first scan driver 152 is not directly applied to the first scan driving chip 152C.

A first connection line CL1 is disposed on the second substrate 114 to electrically connect the first scan driver 152 and the second scan driver 154. The first connection line CL1 connects the second terminal 152-2 of the first scan driver 152 and the first terminal 154-1 of the second scan driver 154. The first connection line CL1 transmits the scan driving voltage, which is applied to the first scan driver 152, to the second scan driver 154.

A second connection line CL2 is disposed on the second substrate 114 to electrically connect the first connection line CL1 and the input terminal of the first scan driving chip 152C. The second connection line CL2 applies the scan driving voltage to the first scan driving chip 152C.

An end of the second connection line CL2 is connected to the first connection line CL1 and another end of the second connection line CL2 is connected to the input terminal 152-Ci of the first scan driving chip 152C.

As shown in FIG. 9, when the first scan driver 152 includes the third terminal 152-3 electrically connected to the input terminal 152-Ci of the first scan driving chip 152C, the other end of the second connection line CL2 is connected to the third terminal 152-3.

To apply the scan driving voltage, which has the same level as the scan driving voltage applied to the second and third scan driving chips 154C and 156C, to the first scan driving chip 152C, the second connection line CL2 may be electrically connected to the first connection line CL1 through the first terminal 154-1 of the second scan driver 154.

A third connection line CL3 is disposed on the second substrate 114 to apply the scan driving voltage, which has the same level as the scan driving voltage applied to the first scan driving chip 152C, to the second scan driving chip 154C and the third scan driving chip 156C.

The third connection line CL3 includes three ends. One of the three ends is electrically connected to the second terminal 154-2 of the second scan driver 154. Another one of the three ends is electrically connected to the input terminal 154-Ci of the second scan driving chip 154C. The remaining one of the three ends is electrically connected to the input terminal 156-Ci of the third scan driving chip 156C.

For example, the third connection line CL3 includes a first sub-line CL3-1 electrically connecting the second terminal 154-2 of the second scan driver 154 and the branch point CL3-P. A second sub-line CL3-2 electrically connects the branch point CL3-P and the input terminal 154-Ci of the second scan driving chip 154C. A third sub-line CL3-3 electrically connects the branch point CL3-P and the input terminal 156-Ci of the three scan driving chip 156C.

When the second scan driver 154 and the third scan driver 156 include the third terminals 154-3 and 156-3, respectively, an end of the second sub-line CL3-2 is connected to the third terminal 154-3 of the second scan driver 154 and an end of the third sub-line CL3-3 is connected to the third terminal 156-3 of the third scan driver 156.

The equivalent circuit diagram of the driving voltage lead-in line IL and the first, second, and third connection lines CL1, CL2, and CL3 with respect to the first, second, and third scan driving chips 152C, 154C, and 156C is the same as shown in FIG. 10.

The equivalent circuit diagram shown in FIG. 10 is the same as the equivalent circuit diagram shown in FIG. 7. Thus, detailed descriptions of the equivalent circuit diagram shown in FIG. 10 will be omitted.

Although the exemplary embodiments of the present invention have been described, it is understood that the present invention should not be limited to these exemplary embodiments but various changes and modifications can be made by one ordinary skilled in the art within the spirit and scope of the present invention.

What is claimed is:
1. A display apparatus comprising:
a first substrate including a first display area in which a plurality of pixels is arranged and a first non-display area disposed adjacent to the first display area;
a second substrate facing the first substrate and including a second display area in which a plurality of photo-sensors is arranged and a second non-display area disposed adjacent to the second display area;
a first driver including a first driving chip arranged in the first or second non-display areas;
a second driver including a second driving chip arranged in the first or second non-display areas;
a third driver including a third driving chip arranged in the first or second non-display areas;
a first connection line extending directly from the first driver to the second driver and transmitting a first driving voltage applied to the first driver to the second driver;
a second connection line extending directly from the first connection line to the first driver and transmitting the first driving voltage to the first driving chip; and
a third connection line transmitting a second driving voltage, having a same level as the first driving voltage, to the second driving chip and the third "chip, the third connection line having a first end directly connected to an input terminal of the second driver, having a second end directly connected to a second terminal of the second driver, and a third end directly connected to an input terminal of the third driver,
wherein the first, second, and third end of the third connection line meet at a branch point that is disposed between the second and third driving chips, and the branch point is disposed on the first or second substrate, and
wherein the first, second, and third connection lines are each disposed on the first or second substrate.
2. The display apparatus of claim 1:
wherein the first, second, and third drivers are arranged in the first non-display area and respectively serve as first, second, and third gate drivers and apply gate signals to the pixels;
wherein the first, second, and third driving chips respectively serve as first, second, and third gate driving chips and convert the gate voltage applied thereto into the gate signals; and
wherein the first gate driver comprises:
a first terminal to which the first driving voltage is applied;
a second terminal from which the first driving voltage is output; and
an inner line connecting the first terminal and the second terminal, and
wherein the second gate driver comprises:
a first terminal to which the second driving voltage is applied;
the second terminal from which the second driving voltage is output; and
an inner line connecting the first terminal and the second terminal.
3. The display apparatus of claim 2, wherein each of the first, second, and third gate driving chips comprises an input terminal to which the first or second driving voltage is applied and a plurality of output terminals from which the gate signals are output.
4. The display apparatus of claim 3, further comprising a plurality of gate lines disposed on the first substrate and connected to the output terminals of each of the first, second, and third gate driving chips, wherein the plurality of gate lines transmit the gate signals to the pixels.
5. The display apparatus of claim 3, wherein the first connection line electrically connects the second terminal of the first gate driver and the first terminal of the second gate driver.
6. The display apparatus of claim 5, wherein the second connection line electrically connects the first connection line and the input terminal of the first gate driving chip.

7. The display apparatus of claim 6, wherein the first gate driver further comprises a third terminal electrically connected to the input terminal of the first gate driving chip, and wherein the second connection line is connected to the third terminal.

8. The display apparatus of claim 5, wherein the third connection line electrically connects the second terminal of the second gate driver and the input terminal of the second gate driving chip and electrically connects the second terminal of the second gate driver and the input terminal of the third gate driving chip.

9. The display apparatus of claim 8, wherein the second gate driver further comprises a fourth terminal electrically connected to the input terminal of the second gate driving chip, the third gate driver further comprises a fifth terminal electrically connected to the input terminal of the third gate driving chip, and the third connection line is connected to the second terminal, the fourth terminal, and the fifth terminal.

10. The display apparatus of claim 9, wherein the third connection line comprises:
   a first sub-line connecting the second terminal of the second gate driver and a branch point;
   a second sub-line connecting the branch point and the fourth terminal; and
   a third sub-line connecting the branch point and the fifth terminal.

11. The display apparatus of claim 10, wherein the second connection line has a resistance value substantially equal to a sum of a resistance value of the first sub-line and a resistance value of the second sub-line.

12. The display apparatus of claim 11, wherein the resistance value of the second sub-line is substantially equal to a resistance value of the third sub-line.

13. The display apparatus of claim 1, further comprising a driving voltage lead-in line that applies the first driving voltage to the first driver.

14. The display apparatus of claim 1, wherein the first, second, and third drivers are arranged in the second non-display area and respectively serve as first, second, and third scan drivers and apply scan signals to the photo-sensors, wherein the first, second, and third driving chips respectively serve as first, second, and third scan driving chips and convert the first or second driving voltage applied thereto into the scan signals, and wherein each of the first and second scan drivers comprises:
   a first terminal to which the first or second driving voltage is applied;
   a second terminal from which the first or second driving voltage is output; and
   an inner line connecting the first terminal and the second terminal.

15. The display apparatus of claim 14, wherein each of the first, second, and third scan driving chips comprises an input terminal to which the first or second driving voltage is applied and a plurality of output terminals from which the scan signals are output.

16. The display apparatus of claim 15, further comprising a plurality of scan lines disposed on the second substrate and connected to the output terminals of the first, second, and third scan driving chips, wherein the plurality of scan lines transmit the scan signals to the photo-sensors.

17. The display apparatus of claim 15, wherein the first connection line electrically connects the second terminal of the first scan driver and the first terminal of the second scan driver.

18. The display apparatus of claim 17, wherein the second connection line electrically connects the first connection line and the input terminal of the first scan driving chip.

19. The display apparatus of claim 18, wherein the first scan driver further comprises a third terminal electrically connected to the input terminal of the first scan driving chip, and wherein the second connection line is connected to the third terminal.

20. The display apparatus of claim 17, wherein the third connection line electrically connects the second terminal of the second scan driver and the input terminal of the second scan driving chip and electrically connects the second terminal of the second scan driver and the input terminal of the third scan driving chip.

21. The display apparatus of claim 20, wherein the second scan driver further comprises a fourth terminal electrically connected to the input terminal of the second scan driving chip, wherein the third scan driver further comprises a fifth terminal electrically connected to the input terminal of the third scan driving chip, and the third connection line is connected to the second terminal, the fourth terminal, and the fifth terminal.

22. The display apparatus of claim 21, wherein the third connection line comprises:
   a first sub-line connecting the second terminal of the second scan driver and the second terminal;
   a second sub-line connecting a branch point and the fourth terminal; and
   a third sub-line connecting the branch point and the fifth terminal.

23. The display apparatus of claim 22, wherein the second connection line has a resistance value substantially equal to a sum of a resistance value of the first sub-line and a resistance value of the second sub-line.

24. The display apparatus of claim 23, wherein the resistance value of the second sub-line is substantially equal to a resistance value of the third sub-line.

25. A display apparatus comprising:
   a first substrate including a first display area in which a plurality of pixels is arranged and a first non-display area disposed adjacent to the first display area;
   a second substrate facing the first substrate and including a second display area in which a plurality of photo-sensors is arranged and a second non-display area disposed adjacent to the second display area; and
   a plurality of drivers arranged in the first or second non-display areas, wherein each of the plurality of drivers receive a driving voltage of a common level from a first connection line extending directly from a first driver of the plurality of drivers to a second driver of the plurality of drivers, a second connection line extending directly from the first connection line to the first driver of the plurality of drivers, and a third connection line having a first end directly connected to an input terminal of the second driver of the plurality of drivers, a second end directly connected to a second terminal of the second driver of the plurality of drivers, and a third end directly connected to an input terminal of a third driver of the plurality of drivers,
   wherein the first, second, and third end of the third connection line meet at a branch point that is disposed between the second and third drivers, and the branch point is disposed on the first or second substrate, and
   wherein the first, second, and third connection lines are each disposed on the first or second substrate.

* * * * *